(12) United States Patent
Shomura et al.

(10) Patent No.: US 9,982,594 B2
(45) Date of Patent: *May 29, 2018

(54) ENGINE FOR OUTBOARD MOTOR

(71) Applicant: SUZUKI MOTOR CORPORATION, Hamamatsu-Shi, Shizuoka (JP)

(72) Inventors: Nobuyuki Shomura, Hamamatsu (JP); Ryuji Hamada, Hamamatsu (JP); Tomohiko Miyaki, Hamamatsu (JP); Toshio Hayashi, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/226,068

(22) Filed: Aug. 2, 2016

(65) Prior Publication Data
US 2017/0044973 A1 Feb. 16, 2017

(30) Foreign Application Priority Data
Aug. 10, 2015 (JP) ................................. 2015-158451

(51) Int. Cl.
| F02B 61/04 | (2006.01) |
| F02B 75/20 | (2006.01) |
| F02B 75/00 | (2006.01) |
| F01N 3/32 | (2006.01) |
| F01N 13/18 | (2010.01) |
| B63H 20/24 | (2006.01) |

(52) U.S. Cl.
CPC .......... F02B 61/045 (2013.01); B63H 20/24 (2013.01); F01N 3/326 (2013.01); F01N 13/18 (2013.01); F02B 75/007 (2013.01); F02B 75/20 (2013.01); F01N 2590/021 (2013.01); Y02T 10/20 (2013.01)

(58) Field of Classification Search
CPC ...... F02B 61/045; F02B 75/007; F02B 75/20; B63H 20/24; F01N 3/326; F01N 13/18; F01N 2590/021; Y02T 10/20
USPC ............................................. 440/88 A, 88 H
See application file for complete search history.

(56) References Cited

U.S. PATENT DOCUMENTS

| 5,427,079 A * | 6/1995 | Andrepont, Jr. .......... F01N 3/20 123/561 |
| 6,213,829 B1 * | 4/2001 | Takahashi ............. F02B 61/045 440/113 |
| 6,955,161 B2 * | 10/2005 | Suzuki .................... F02B 61/02 123/478 |
| 2010/0056001 A1 | 3/2010 | Konakawa et al. |

FOREIGN PATENT DOCUMENTS

JP     2010053771 A     3/2010

* cited by examiner

Primary Examiner — Anthony D Wiest
(74) Attorney, Agent, or Firm — Troutman Sanders LLP

(57) ABSTRACT

An intake system is arranged in a side portion of one side of an engine body in a left-right direction, and the exhaust passage and the air pump are arranged in a side portion of the other side of the cylinder block and the cylinder head of the engine body in the left-right direction.

4 Claims, 11 Drawing Sheets

F I G. 6
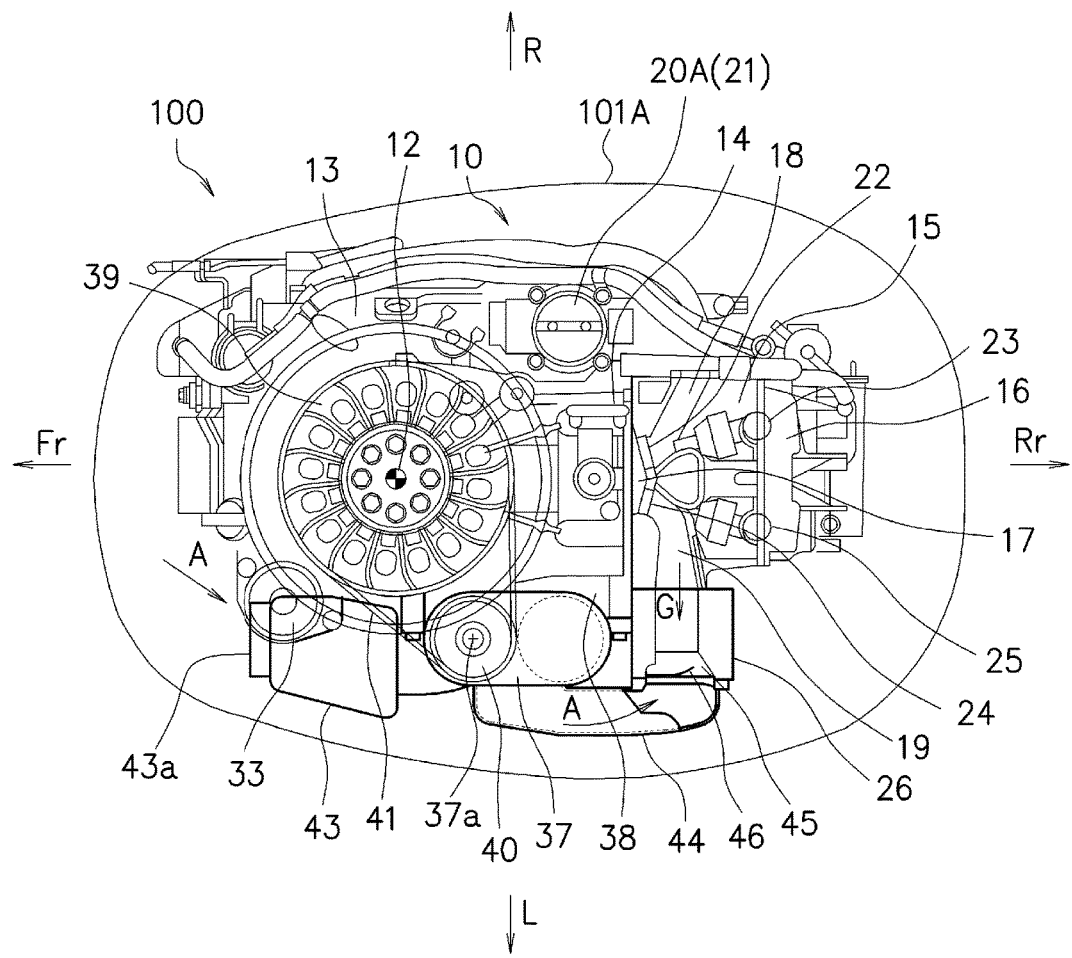

F I G. 9
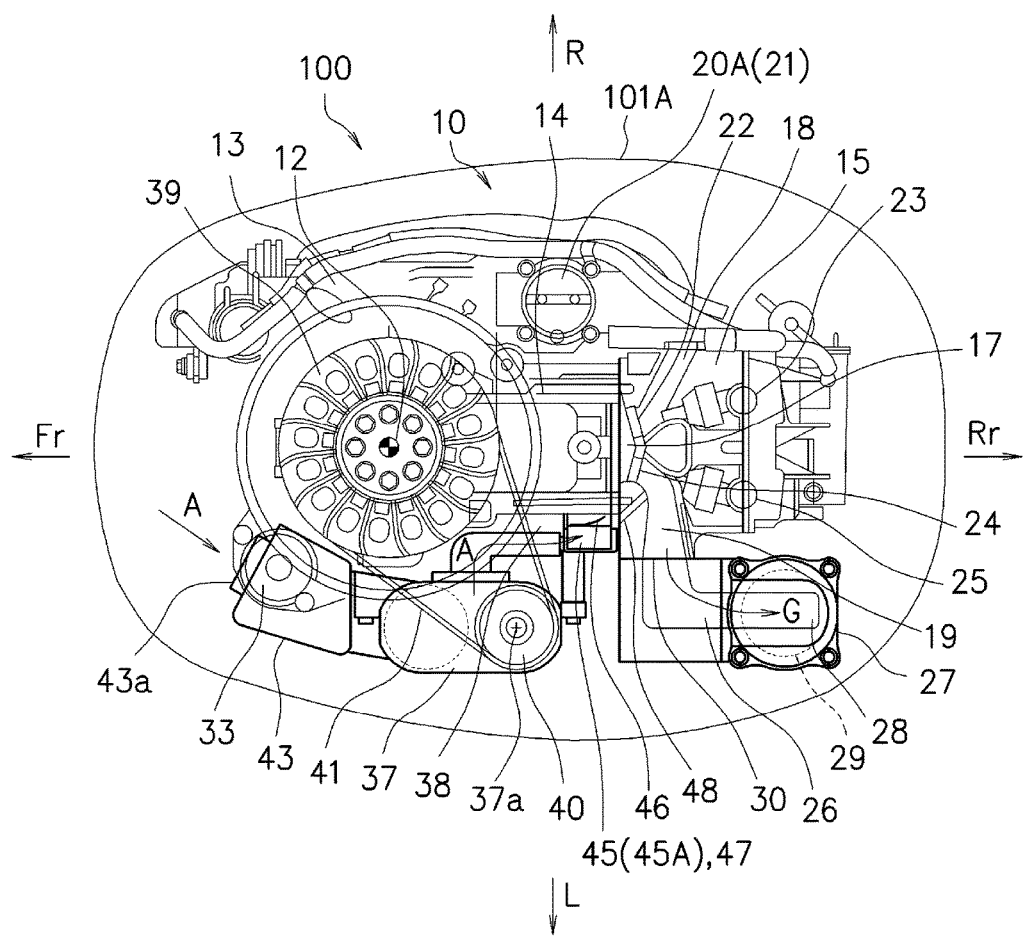

ENGINE FOR OUTBOARD MOTOR

CROSS-REFERENCE TO RELATED APPLICATION

This application is based upon and claims the benefit of priority of the prior Japanese Patent Application No. 2015-158451, filed on Aug. 10, 2015, the entire contents of which are incorporated herein by reference.

BACKGROUND OF THE INVENTION

Field of the Invention

The present invention relates to an engine for an outboard motor, and more particularly, to an engine for an outboard motor in which secondary air is supplied to an exhaust passage.

Description of the Related Art

An outboard motor mounted on a small boat and the like is configured such that an upper unit and a guide exhaust are connected to an upper part of a lower unit provided with a propeller, an engine is supported and fixed on the guide exhaust, the engine is covered by an engine cover, and a propeller is rotated and driven by the engine. An exhaust gas output from the engine is discharged to the seawater through an exhaust passage vertically provided on the side face of the engine across upper and lower units.

In such an engine for an outboard motor, a catalytic converter may be provided in the exhaust passage in order to purify the exhaust gas and comply with an exhaust gas control requirement in some cases. Furthermore, an air pump configured to supply the secondary air to the exhaust passage is provided in order to supply oxygen necessary to purify the exhaust gas by oxidizing hydrocarbons and carbon monoxides in the exhaust system.

For example, Japanese Laid-open Patent Publication No. 2010-53771 discusses an outboard motor provided with an air pump supported by an engine to supply secondary air to the upstream side of the catalytic converter in the middle of the exhaust passage. An air inlet port (air inlet hole) of the air pump is opened in a position higher than the engine inside a cowling in order to prevent water from mixing to the secondary air supplied by the air pump to the exhaust passage.

Patent Document 1: Japanese Laid-open Patent Publication No. 2010-53771

In general, an engine, an intake system, and an exhaust system of an outboard motor are housed in an engine housing covered by a cowling which is an engine cover. It is not easy to arrange accessories such as a catalytic converter or an air pump in addition to the intake and exhaust systems within a limited space of the engine housing. That is, a limitation inevitably exists in arrangement due to a relationship with neighboring components. It is difficult to compactly arrange a plurality of functional devices or components while the exhaust gas purification functionality is reliably obtained. In practice, this results in a size increase of the outboard motor.

SUMMARY OF THE INVENTION

In view of the aforementioned problems, it is therefore an object of the present invention to provide an engine for an outboard motor capable of effectively and suitably achieving compactification and purifying the exhaust gas.

According to an aspect of the present invention, there is provided an engine for an outboard motor, including: an in-line multiple-cylinder engine body provided with a crankshaft having an axial line directed to a vertical direction and a plurality of vertically overlapping cylinders, the cylinders having axial lines directed backward in a horizontal direction; an intake system configured to supply combustion air to the engine body; an exhaust passage formed to connect the engine body and middle and lower units thereunder; and an air pump of a secondary air supply system configured to supply secondary air to the exhaust passage, wherein an intake system is arranged in a side portion of one side of the engine body in a left-right direction, and the exhaust passage and the air pump are arranged in a side portion of the other side of the cylinder block and the cylinder head of the engine body in the left-right direction.

The engine for the outboard motor described above may further include a starter motor arranged in a side portion of the other side of the crankcase of the engine body in the left-right direction, and the air pump of the secondary air supply system may be arranged in a side portion of the cylinder block between the starter motor and the exhaust passage.

In the engine for the outboard motor described above, the air pump may be connected to a crankshaft of the engine through a power transmission device and may be driven by power of the engine.

In the engine for the outboard motor described above, the power transmission device may have a clutch mechanism capable of controlling transmission of a driving force.

The engine for the outboard motor described above may further include a catalyst installed in the middle of the exhaust passage, and the secondary air may be supplied to an upstream side of the catalyst in the exhaust passage using the intake system.

BRIEF DESCRIPTION OF THE DRAWINGS

FIG. 6 is a top view illustrating the engine of the outboard motor according to the second embodiment of the invention;

FIG. 9 is a top view illustrating the engine of the outboard motor according to the third embodiment of the invention;

DETAILED DESCRIPTION OF THE PREFERRED EMBODIMENTS

An engine for an outboard motor according to preferred embodiments of the present invention will now be described with reference to the accompanying drawings.

Figure 1:
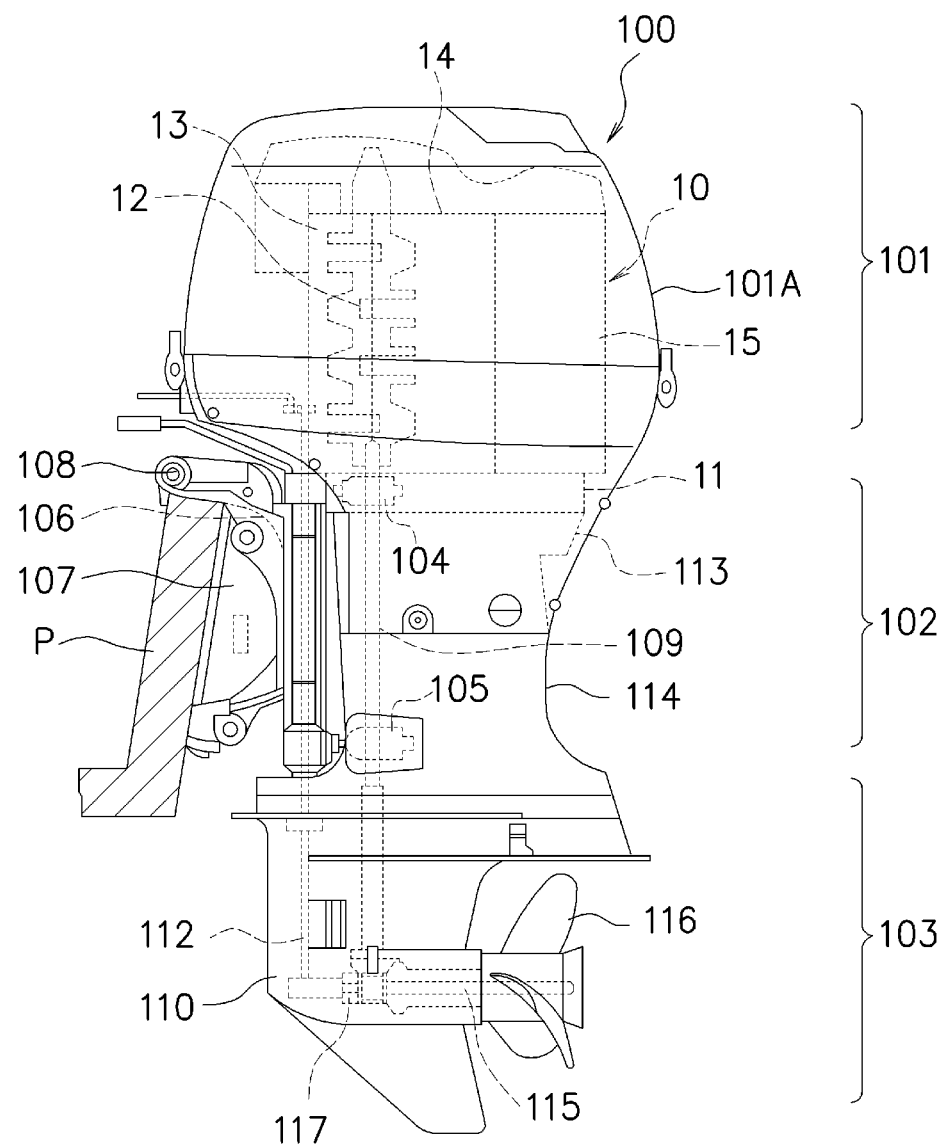
FIG. 1 is a left side view schematically illustrating an exemplary whole structure of an outboard motor according to a first embodiment of the invention.

FIG. 1 is a left side view schematically illustrating an exemplary structure of an outboard motor 100 according to the present invention. In this case, a front side of the outboard motor 100 is fixed to a transom P of a ship hull as illustrated in FIG. 1. It is noted that, in the following description for each drawing, the arrow Fr denotes a front side of the outboard motor 100, the arrow Rr denotes a rear side of the outboard motor 100, the arrow R denotes a right side of the outboard motor 100, and the arrow L denotes a left side of the outboard motor 100 as necessary.

First Embodiment

In the entire configuration of the outboard motor 100, an upper unit 101, a middle unit 102, and a lower unit 103 are sequentially arranged from the upside to the downside. In the upper unit 101, the engine 10 is vertically installed in and supported by an engine holder 11 such that a crankshaft 12 is directed to a vertical direction. As the engine 10, various engine types such as an in-line multi-cylinder engine may be employed. A cylinder block 14, a cylinder head 15, and a cylinder head cover 16 are sequentially assembled to a crankcase 13 that supports the crankshaft 12. In the engine 10, a plurality of cylinders having cylinder axes directed backward in a horizontal direction are arranged in a vertically overlapping manner. Further, the engine 10 is covered by the engine cover 101A.

The middle unit 102 is supported by upper and lower mounts 104 and 105 horizontally pivotably around a support shaft set in a swivel bracket 106. A clamp bracket 107 is provided in both sides of the swivel bracket 106, so that the middle unit 102 is fixed to the transom P of the ship hull using the clamp bracket 107. The swivel bracket 106 is supported vertically pivotably around a tilt shaft 108 set in the left-right direction.

In the middle unit 102, a drive shaft 109 connected to a lower end portion of the crankshaft 12 of the engine 10 is arranged to vertically penetrate, so that a drive force of the drive shaft 109 is transmitted to a propeller shaft 115 arranged in a gear casing 110 of the lower unit 103. A shift rod 112 for shifting a gear position forward or backward is arranged in front of the drive shaft 109 in parallel with the vertical direction. In addition, the middle unit 102 is also provided with an oil pan 113 for storing oil for lubricating the engine 10. Further, the middle unit 102 has a drive shaft housing 114 for housing the drive shaft 109.

In the lower unit 103, the gear casing 110 internally has a plurality of gear groups 117 and the like to rotatably drive the propeller 116 using the propeller shaft 115 by virtue of the drive force of the drive shaft 109. In the gear group 117, a gear provided in the drive shaft 109 extending downward from the middle unit 102 meshes with the gear of the gear casing 110 so as to finally rotate the propeller 116. However, a power transmission path of the gear group 117 in the gear casing 110 is switched, that is, shifted by performing a shift operation using the shift rod 112.

Figure 2:
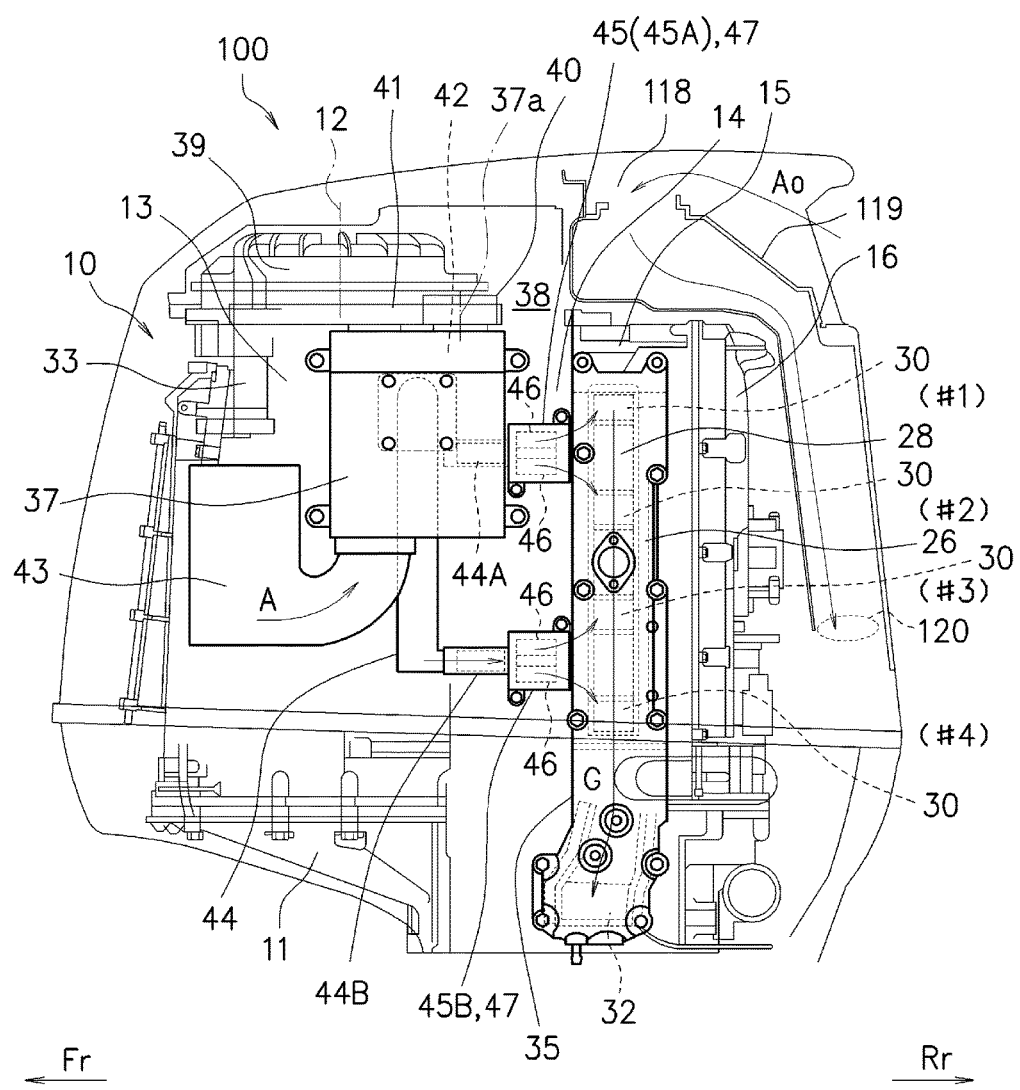
FIG. 2 is a left side view illustrating an engine of the outboard motor according to the first embodiment of the invention.
Figure 3:
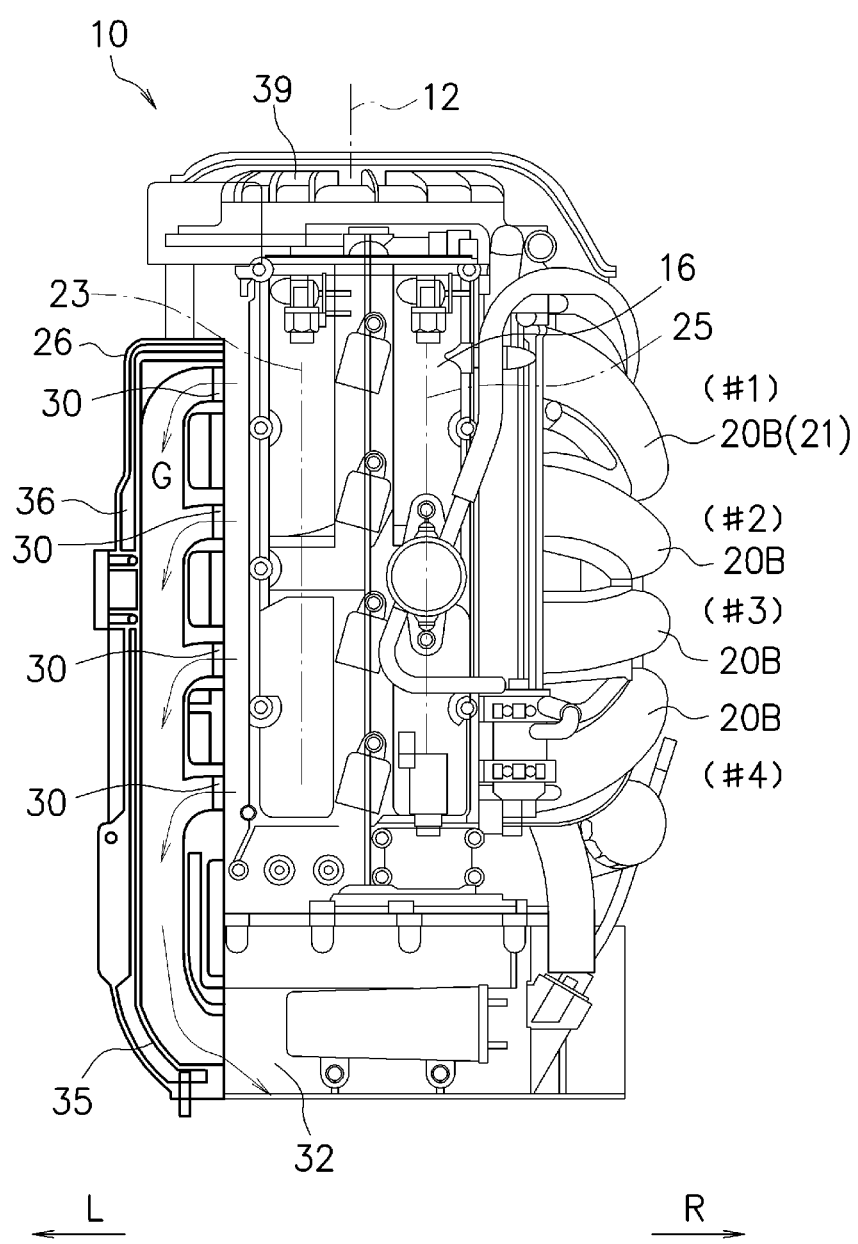
FIG. 3 is a rear front view illustrating the engine of the outboard motor according to the first embodiment of the invention.
Figure 4:
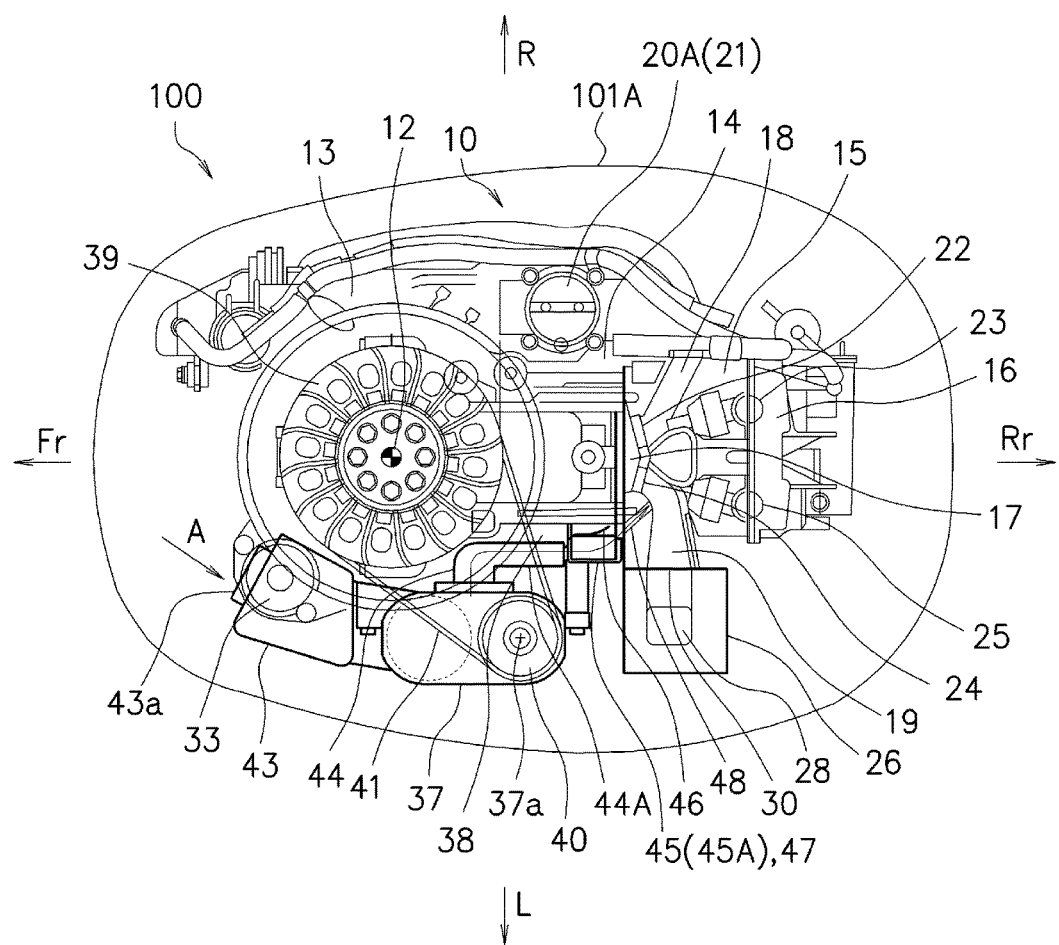
FIG. 4 is a top view illustrating the engine of the outboard motor according to the first embodiment of the invention.

FIGS. 2 to 4 illustrate an exemplary engine 10 according to this embodiment. FIG. 2 is a left side view illustrating the engine 10. FIG. 3 is a rear front view illustrating the engine 10. FIG. 4 is a top view illustrating the engine 10. It is assumed that the engine 10 of this example is an in-line four-cylinder engine, in which four cylinders including the first cylinder #1, the second cylinder #2, the third cylinder #3, and the fourth cylinder #4 are sequentially arranged from the upside as illustrated in FIG. 3. The engine 10 is mounted onto the engine holder 11 in the fourth cylinder (#4) side such that the crankcase 13 is arranged in the front side, and the cylinder head 15 is arranged in the rear side. While the engine 10 will be described in brief with reference to FIGS. 2 to 4, some of components thereof may be appropriately omitted or not as necessary for simplicity purposes.

In the crankcase 13, the crankshaft 12 (crankshaft) is supported by a plurality of journal bearings in its upper and lower end portions and the middle portion therebetween rotatably inside the crankcase 13. The lower end of the crankshaft 12 may also be coupled to the upper end of the drive shaft 109, for example, by interposing a pair of coupling gears (reduction gears). As a result, the rotational force of the crankshaft 12 is transmitted to the drive shaft 109.

The cylinder block 14 is internally provided with cylinder bores for each cylinder, so that pistons are inwardly fitted to the cylinder bores in a reciprocatable manner (in this example, in a front-rear direction). The piston is connected to a crank pin of the crankshaft 12 by interposing a connecting rod. As a result, a reciprocating motion of the piston inside the cylinder bore is converted into a rotational motion of the crankshaft 12 and is transmitted to the drive shaft 109 as the output power of the engine 10.

Referring to FIG. 4, the cylinder head 15 is provided with combustion chambers 17 matching cylinder bores of each cylinder and intake and exhaust ports 18 and 19 communicating with respective combustion chambers 17. In this example, an intake system is arranged in the right side of the engine 10, and an exhaust system is arranged in the left side of the engine 10. First, in the intake system, the intake air flows into an intake manifold with a flow rate controlled by a throttle body 20A arranged in the right side of the cylinder block 14. This intake air is supplied to an intake port 18 via an intake branch 20B configured to branch the intake air to each cylinder from the intake manifold (refer to FIG. 3). The throttle body 20A, the intake branch 20B, the intake manifold, and the like constitute an intake system 21 for supplying combustion air to the engine 10. For the open/close operation of the intake port 18, a communicating portion to the combustion chamber 17 is controlled by an intake valve 22. In this case, the intake valve 22 is driven by a cam provided in an intake cam shaft 23 provided to vertically extend. In addition, for the open/close operation of the exhaust port 19 in the exhaust system, a communicating portion to the combustion chamber 17 is controlled by an exhaust valve 24. In this case, the exhaust valve 24 is driven by a cam provided in an exhaust cam shaft 25 provided to vertically extend. It is noted that, in this embodiment, each cylinder may have a so-called four-valve structure having a pair of valves (intake valves 22 and exhaust valves 24) for the intake and exhaust sides, respectively.

On top of the combustion chamber 17 of each cylinder, an ignition plug is installed, so that a mixed gas supplied to the inside of the combustion chamber 17 is ignited by the ignition plug. Furthermore, the combustion gas exploded and combusted inside each cylinder bore of each cylinder is discharged from the exhaust port 19 to the exhaust manifold 26. In each cylinder, the exhaust manifold 26 provided in the outer side portion of the cylinder bore of the cylinder block 14 is connected to the exhaust port 19 to communicate with each other. As illustrated in FIGS. 2 and 3, the exhaust manifold 26 is provided to vertically extend on the left side face of the cylinder head 15 so that the exhaust gases from each exhaust port 19 are joined. The confluent exhaust gas passes through the exhaust manifold 26 and is finally guided to the lower side of the engine 10 as described below. Then, the exhaust gas passes through an exhaust passage formed inside the engine holder 11 and is finally discharged to the water.

As an exemplary configuration of the engine 10 according to this embodiment, an exhaust passage 28 is formed to extend from the exhaust manifold 26 of the exhaust system to the middle and lower units 102 and 103 provided in the lower part of the engine 10. The exhaust manifold 26 included in a part of the exhaust passage 28 is provided with a plurality of openings 30 (in this example, four openings) connected to the exhaust ports 19 of each cylinder. Furthermore, the exhaust passage 28 extends downward (to form an extension 35) while it is curved under the exhaust manifold 26 and is connected to an exhaust communicating passage 32 formed inside the engine holder 11, so that the exhaust passage 28 communicates with the middle unit 102 through the exhaust communicating passage 32. Moreover, a water jacket 36 is provided in the outer circumferential portion of the passage generally along the entire length of the exhaust passage 28. As a result, a coolant sent from a water pump of a cooling system is circulated through the inside of the water jacket 36 to cool the exhaust passage 28.

Here, in the engine 10, the crankcase 13, the cylinder block 14, the cylinder head 15, and the cylinder head cover 16 generally constitute an engine body. An intake system 21 for supplying combustion air to the engine body is arranged in one side of the engine body in the left-right direction, that is, in the right side in this example. In addition, an exhaust passage 28 for discharging the combustion gas from the engine body is arranged in the other side of the engine body in the left-right direction, that is, in the left side in this example.

In the exhaust system, the exhaust gases discharged from the exhaust ports 19 of each cylinder flow into the opening 30 of the exhaust manifold 26 and are joined inside the exhaust manifold 26 (in FIGS. 2 to 4, the arrow G denotes the flow of the exhaust gas as necessary). The confluent exhaust gas flows downward inside the exhaust manifold 26, further passes through the exhaust communicating passage 32 inside the engine holder 11 and is then discharged to the water via the middle and lower units 102 and 103.

According to the present invention, an air pump configured to supply secondary air to the exhaust passage 28 is further provided. This air pump 37 supplies the secondary air to the exhaust gas flowing through the exhaust passage 28 in order to purify the exhaust gas, that is, supplies oxygen necessary to oxidize and detoxify hydrocarbons and carbon monoxides in the exhaust system. That is, oxidization of the exhaust gas is promoted by reacting oxygen with the exhaust gas, and a discharge amount of hydrocarbons and carbon monoxides is reduced.

According to this embodiment, the air pump 37 is arranged in the other side of the engine body in the left-right direction (in this example, in the left side), that is, in the same side as that of the exhaust passage 28. As a type of the compressor employed in the air pump 37, a root type, a Lysholm type, a centrifugal type, and the like are known in the art, and any type of pumps may be suitably employed. In this example, as illustrated in FIGS. 2 and 4, the air pump 37 is arranged in a front side of the engine body relative to the exhaust manifold 26. A rotation shaft 37a of the air pump 37 may be set in a vertical direction. The air pump 37 is tightly fixed to a side wall of the cylinder block 14 by a bolt and the like in a concave portion 38 (FIG. 4) on a side face of the cylinder block 14 spanning across the #1 to #2 cylinders.

The power of the engine 10 may be used as a power source of the air pump 37, and a power transmission device connected to the crankshaft 12 to drive the air pump 37 is provided. In this example, as a power transmission device, a flywheel 39 side coupled to the crankshaft 12 and a pulley 40 installed in a rotation shaft 37a of the air pump 37 are connected by looping a belt 41. In this manner, the air pump is rotated and driven by using the driving force of the crankshaft 12. However, in this case, power transmission therebetween may be controlled. For example, a clutch mechanism, specifically, an electromagnetic clutch 42 is assembled to a mount portion of the pulley 40 of the rotation shaft 37a of the air pump 37. Using the electromagnetic clutch 42, connection/disconnection of power transmission of the driving force from the crankshaft 12 to the air pump is controlled. Here, since the fuel supplied to the engine 10 becomes rich in the event of acceleration of the outboard motor 100 and the like, an oxygen concentration of the exhaust gas becomes thin. For this reason, the air pump 37 is driven and controlled to supply the secondary air to the exhaust gas. In this case, an oxygen concentration in the exhaust gas may be detected using an oxygen concentration sensor (not shown), so that the oxygen concentration detection value is transmitted to an electronic control unit (ECU) mounted to the outboard motor 100. The ECU operates the electromagnetic clutch 42, that is, controls driving of the air pump depending on whether or not the oxygen concentration of the exhaust gas is equal to or higher than a predetermined threshold value on the basis of the oxygen concentration information.

An air inlet 43 for receiving the secondary air is connected to the air pump 37, and the secondary air is supplied from the air inlet 43 to the air pump (in FIG. 2, the arrow A denotes a flow of the secondary air). The air inlet 43 is arranged in a lateral side of the crankcase 13 closely to the front side of the air pump 37 and has a generally cavity structure. In addition, an inlet duct 43a for receiving the air is opened in a front end of the air inlet 43, as illustrated in FIG. 4. The air inlet 43 has a gas-liquid separation capability and a sound muffling capability for the received air. Further, the air inlet 43 may be embedded with an air filter, and as a result, the secondary air blowing to the air pump 37 is purified. Here, the engine 10, the intake system, and the exhaust system are housed in the engine housing 118 covered by the engine cover 101A (cowling). An external air guide unit for guiding the external air to the inside of the engine housing 118, specifically, an external air intake duct 119 is provided as illustrated in FIG. 2. In the vicinity of the bottom of the external air intake duct 119, an inflow port 120 for receiving the air guided from the external air intake duct 119 is opened in a rear part of the engine housing 118 behind the engine body (in FIG. 2, the arrow $A_o$ denotes a flow of the air guided to the inside of the engine housing 118). The inlet duct 43a of the air inlet 43 is positioned vertically higher than the inflow port 120 of the external air intake duct 119 in a front part of the engine housing 118.

The air pump 37 and the exhaust system are connected to each other by interposing the secondary air supply passage 44. According to this embodiment, the connecting portion 45 (45A and 45B) of the secondary air supply passage 44 (44A and 44B) is formed integrally with the cylinder block 14 included in the engine body, and the secondary air supply passage 44 extending from the right side face of the air pump 37 branches into two separate ways, and the branching secondary air supply passages 44A and 44B are connected to the connecting portions 45A (#1 and #2 cylinders) and 45B (#3 and #4 cylinders), respectively. Each connecting portion 45A and 45B is installed with a reed valve 46 for each cylinder, and a cover 47 is installed to cover the reed valve 46. A communicating passage 48 that causes the connecting portions 45A and 45B and the exhaust ports 19 of each cylinder to communicate with each other is provided, so that the secondary air discharge side of each reed valve 46 and the exhaust port 19 are connected to each other by interposing the communicating passage 48.

According to the present invention, in particular, the intake system 21 is arranged in one side (right side) of the left-right direction of the engine body, and the exhaust passage 28 and the air pump 37 are arranged in the other side (left side) of the left-right direction of the engine body. In addition, as illustrated in FIGS. 2 and 4, a starter motor 33 is arranged in the side portion of the crankcase 13 in the other side of the left-right direction of the engine body, and the air pump 37 of the secondary air supply system is arranged in the side portion of the cylinder block 14 between the starter motor 33 and the exhaust passage 28. The output shaft of the starter motor 33 meshes with the flywheel 39 on its gears to rotate and drive the flywheel 39 in the event of an engine start.

In the exhaust system of the engine 10, the exhaust gases discharged from the exhaust ports 19 of each cylinder flow to the opening 30 of the exhaust manifold 26 and are joined in the exhaust manifold 26, so that the confluent gas is discharged to the water through the exhaust passage 28. The secondary air is supplied to the exhaust gas by operating an electromagnetic clutch 42 using the ECU to drive the air pump 37. Hydrocarbons, carbon monoxides, nitrogen oxides, and the like contained in the exhaust gas are oxidized or reduced. As a result, hazardous substances of the exhaust gas are removed, that is, the exhaust gas can be purified.

According to the present invention, first, the air pump 37 can be disposed in the vicinity to the exhaust passage 28. Therefore, it is possible to shorten the length of the secondary air supply passage 44 as a secondary air channel for sending the secondary air to the exhaust passage 28. As a result, it is possible to simplify routing of the secondary air supply passage 44 and reduce a passage resistance for the air flow flowing through the inside. Since the efficiency of the air pump 37 is improved, it is possible to miniaturize the air pump 37.

The air pump 37 is connected to the crankshaft 12 of the engine 10 by interposing the power transmission device including the pulley 40 and the belt 41, so that the air pump 37 is advantageously driven by the power of the engine 10.

In this manner, the air pump 37 is arranged in the side portion of the cylinder block 14 in the vicinity of the crankcase 13 that houses the crankshaft 12. Since the air pump 37 can be driven by the crankshaft 12 of the engine 10, it is possible to eliminate necessity of a driving source dedicated to the air pump 37. Therefore, it is possible to simplify the configuration and compactify the outboard motor 100 depending on the type of the engine 10.

As a device for transmitting power to the air pump 37, a clutch mechanism capable of controlling transmission of the driving force, that is, the electromagnetic clutch 42 is provided.

Since the driving of the air pump 37 can be controlled as necessary, it is possible to eliminate necessity of an adjustment valve or the like for adjusting a supply amount of the secondary air depending on a driving state of the engine 10 and reduce a loss in the output power of the engine caused by unnecessary driving of the air pump 37. Therefore, it is possible to anticipate improvement of the fuel efficiency.

Second Embodiment

Figure 5:
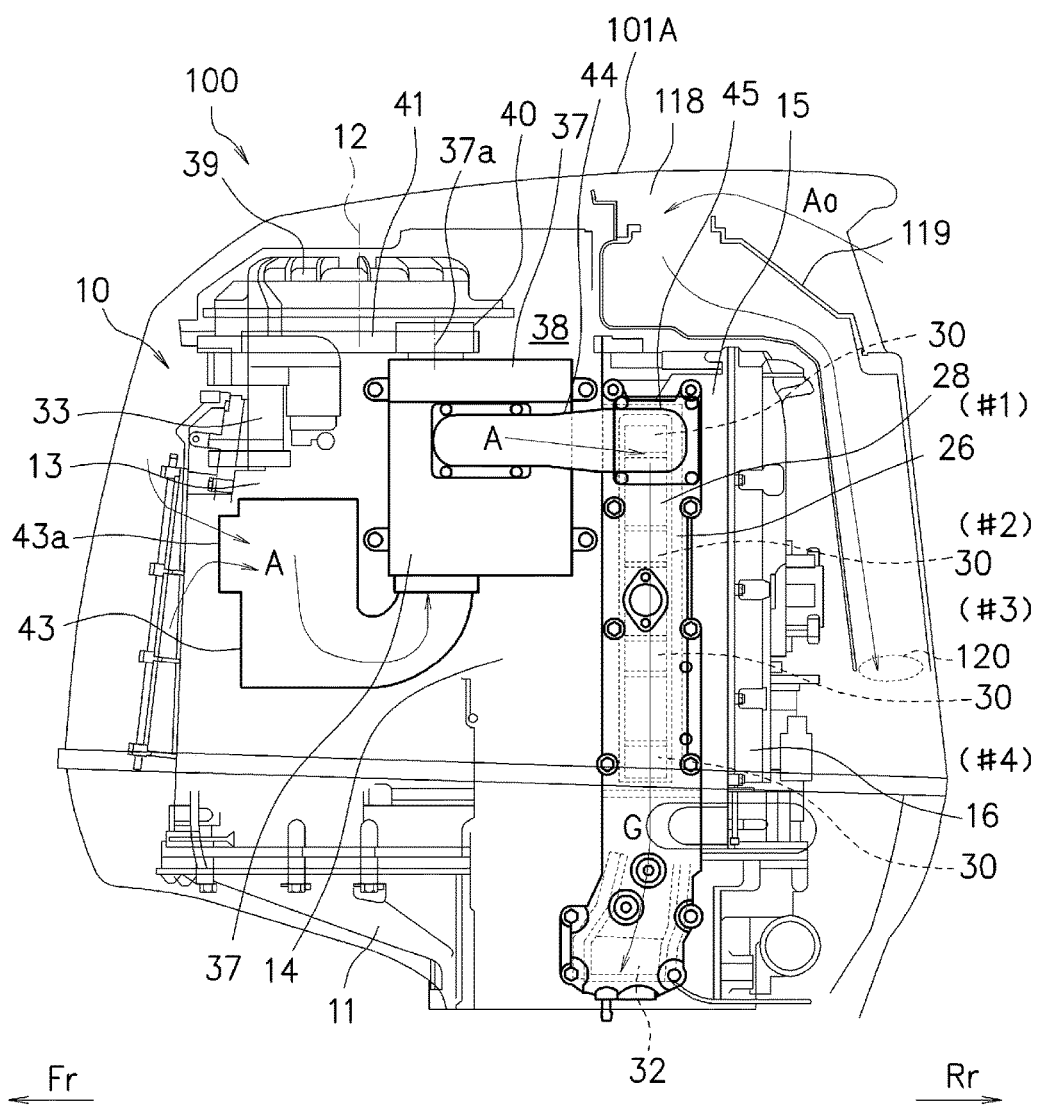
FIG. 5 is a left side view illustrating an engine of an outboard motor according to a second embodiment of the invention.

Next, an engine for an outboard motor according to a second embodiment of the invention will be described. FIG. 5 is a left side view illustrating an engine 10 according to the second embodiment, and FIG. 6 is a top view illustrating the engine 10. In FIGS. 5 and 6, like reference numerals denote like elements as in the first embodiment.

According to the second embodiment, the air pump and the exhaust manifold 26 as a part of the exhaust passage 28 are connected to each other by interposing a secondary air supply passage 44. In this case, the single secondary air supply passage 44 extends backward from the left side face of the air pump 37 and then extends to the left side face of the exhaust manifold 26. A leading end portion of the secondary air supply passage 44 is opened for connection to the exhaust manifold 26. The single connecting portion 45 of the exhaust passage 28 for connection to the secondary air supply passage 44 is provided in an upstream side of the exhaust flow direction, in this example, in the most upstream side of the exhaust flow direction in the exhaust manifold (a region approximately matching the #1 cylinder). A reed valve 46 (check valve) is installed in the connecting portion 45 as illustrated in FIG. 6. The reed valve 46 prevents a reverse flow of the exhaust gas from the exhaust passage 28 to the air pump 37.

Similarly, in this example, the intake system 21 is arranged in one side (right side) of the left-right direction of the engine body, and the exhaust passage 28 and the air pump 37 are arranged in the other side (left side) of the left-right direction of the engine body. In addition, as illustrated in FIGS. 5 and 6, a starter motor 33 is arranged in the side portion of the crankcase 13 in the other side of the left-right direction of the engine body, and the air pump 37 of the secondary air supply system is arranged in the side portion of the cylinder block 14 between the starter motor 33 and the exhaust passage 28. The output shaft of the starter motor 33 meshes with the flywheel 39 on its gears to rotate and drive the flywheel 39 in the event of an engine start.

According to the second embodiment of the present invention, the air pump 37 can be disposed in the vicinity to the exhaust passage 28. Therefore, it is possible to shorten the length of the secondary air supply passage 44 as a secondary air channel for sending the secondary air to the exhaust passage 28. As a result, it is possible to simplify routing of the secondary air supply passage 44 and reduce a passage resistance for the air flow flowing through the inside. Since the efficiency of the air pump 37 is improved, it is possible to miniaturize the air pump 37.

Since the air pump can be driven using the crankshaft 12 of the engine 10, it is possible to eliminate necessity of a driving source dedicated to the air pump 37. Therefore, it is possible to simplify and compactify a configuration of the engine 10 and thus the outboard motor 100.

Third Embodiment

Figure 7:
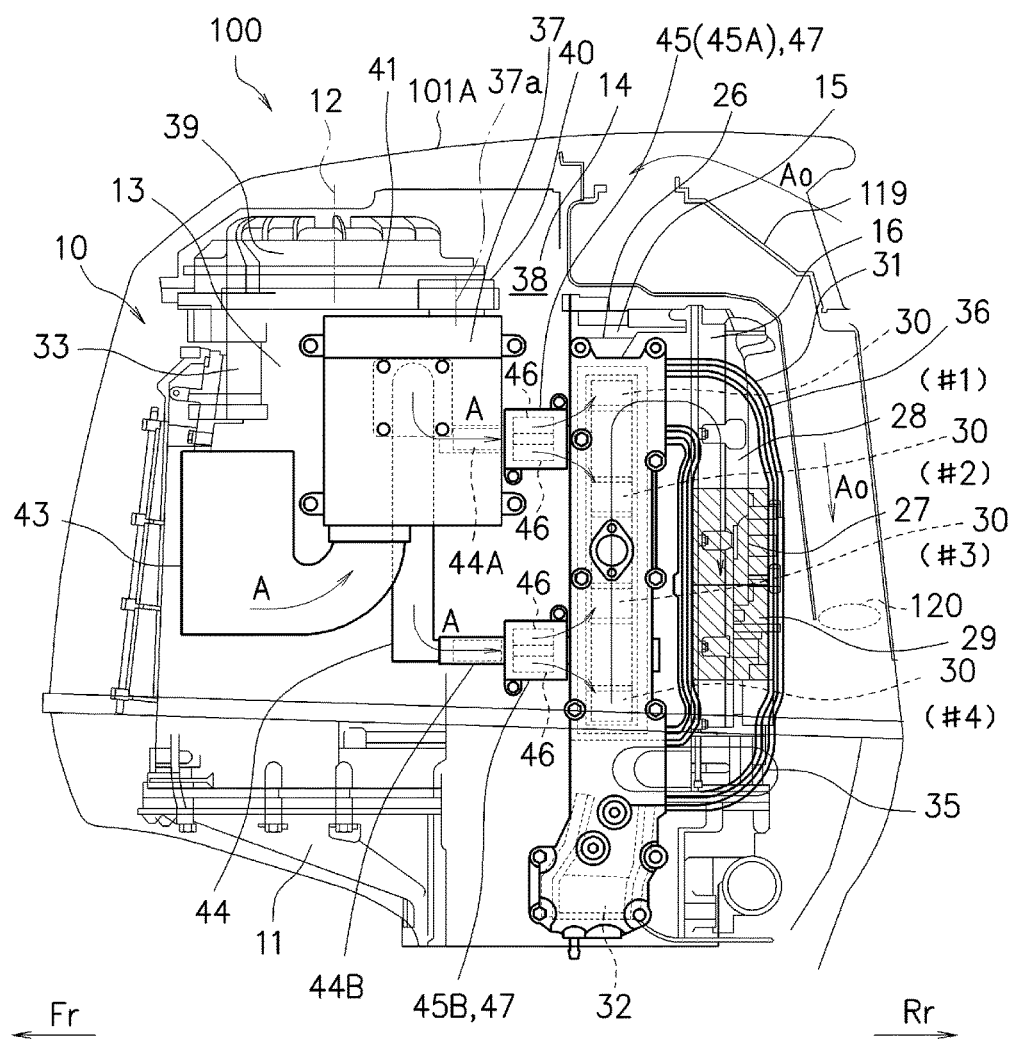
FIG. 7 is a left side view illustrating an engine of an outboard motor according to a third embodiment of the invention.
Figure 8:
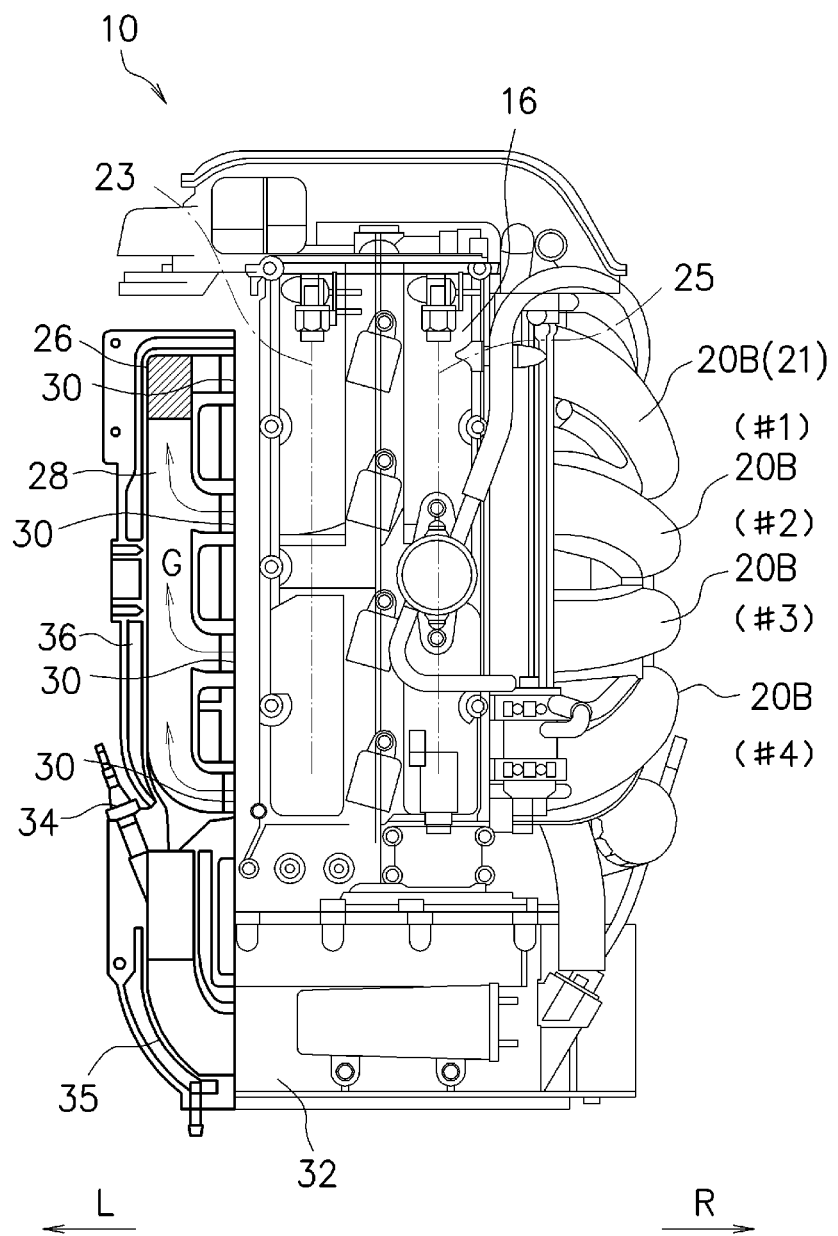
FIG. 8 is a rear front view illustrating the engine of the outboard motor according to the third embodiment of the invention.

Next, an engine for an outboard motor according to a third embodiment of the invention will be described. FIGS. 7 to 9 illustrate the third embodiment of the present invention. Specifically, FIG. 7 is a left side view illustrating an engine 10 according to the third embodiment, FIG. 8 is a rear front view of the engine 10, and FIG. 9 is a top view illustrating the engine 10. In FIGS. 7 to 9, like reference numerals denote like elements as in the first and second embodiments.

As an exemplary structure of the engine 10 according to the third embodiment, a catalyst is installed in the middle of the exhaust passage of the exhaust system. As illustrated in FIG. 7, an exhaust passage 28 is formed to extend from the exhaust manifold 26 via the catalyst housing portion 27 to the middle and lower units 102 and 103 provided in the lower part of the engine 10. The catalyst housing portion 27 is provided to extend vertically in parallel with the exhaust manifold 26 behind the exhaust manifold 26 and internally houses the catalyst 29. The exhaust manifold 26 included in a part of the exhaust passage 28 is provided with a plurality of openings 30 (in this example, four openings) connected to the exhaust ports 19 of each cylinder. In addition, the upper parts of the exhaust manifold 26 and the catalyst housing portion 27 are connected to each other through the connecting passage 31. Furthermore, the exhaust passage 28 extends downward while it is curved under the catalyst housing portion 27 (an extension 35) and is connected to an exhaust communicating passage 32 formed inside the engine holder 11, so that the exhaust passage 28 communicates with the middle unit 102 through the exhaust communicating passage 32.

In this manner, the exhaust passage 28 includes the exhaust manifold 26, the connecting passage 31, the catalyst housing portion 27, and the exhaust communicating passage 32. In the middle of the exhaust passage 28, an oxygen concentration sensor 34 for detecting an oxygen concentration of the exhaust gas is installed in an exhaust downstream side of the catalyst housing portion 27 that houses the catalyst 29, specifically, in a suitable region of an extension 35 from the lower part of the catalyst housing portion 27 (refer to FIGS. 7 and 8). Alternatively, an oxygen concentration sensor may be installed in an exhaust upstream side of the catalyst housing portion 27, for example, in a suitable region of the exhaust manifold 26 or the connecting passage 31. Using such an oxygen concentration sensor 34, it is possible to detect an oxygen concentration of the exhaust gas in such an installation region.

In the exhaust system, the exhaust gases discharged from the exhaust ports 19 of each cylinder flow into the opening 30 of the exhaust manifold 26 and are joined inside the exhaust manifold 26 (in FIGS. 7 to 9, the arrow G denotes a flow of the exhaust gas as necessary). The confluent exhaust gas flows upward inside the exhaust manifold 26 and flows to the catalyst housing portion 27 through the connecting passage 31 in the upper part thereof. Further, the exhaust gas passes through the catalyst inside the catalyst housing portion 27 and flows to the extension 35 from the lower part of the catalyst housing portion 27. Then, the exhaust gas passes through the exhaust communicating passage 32 of the engine holder 11 and is discharged to the water through the middle and lower units 102 and 103.

Furthermore, an air pump 37 configured to supply secondary air to the upstream side of the catalyst 29 is provided in the exhaust passage 28. This air pump supplies the secondary air to the exhaust gas flowing through the exhaust passage 28 in order to purify the exhaust gas, that is, supplies oxygen necessary to oxidize and detoxify hydrocarbons and carbon monoxides in the exhaust system. That is, oxidization of the exhaust gas is promoted by reacting oxygen with the exhaust gas, so that a discharge amount of hydrocarbons and carbon monoxides is reduced.

The power of the engine 10 may be used as a driving source of the air pump 37, and a power transmission device connected to the crankshaft 12 to drive the air pump 37 is provided. As a power transmission device, a flywheel 39 coupled to the crankshaft 12 and a pulley 40 installed in a rotation shaft 37a of the air pump 37 are connected by looping a belt 41. In this manner, the air pump 37 is rotatably driven by using the driving force of the crankshaft 12. However, in this case, power transmission therebetween may be controlled. For example, a clutch mechanism, specifically, an electromagnetic clutch 42 is assembled to a mount portion of the pulley 40 of the rotation shaft 37a of the air pump 37. Using the electromagnetic clutch 42, connection/disconnection of power transmission of the driving force from the crankshaft 12 to the air pump 37 is controlled.

Here, since the fuel supplied to the engine 10 becomes rich in the event of acceleration of the outboard motor 100 and the like, an oxygen concentration of the exhaust gas becomes thin. For this reason, the air pump 37 is driven and controlled to supply the secondary air to the exhaust gas. As the exhaust gas passes through the catalyst 29 inside the catalyst housing portion 27, hydrocarbons, carbon monoxides, and nitrogen oxides predominantly contained in the exhaust gas are oxidized or reduced. As a result, hazardous substances of the exhaust gas are removed, that is, the exhaust gas is purified. For efficient oxidization or reduction, it is necessary to set a theoretical air-fuel ratio by which the fuel and the air are perfectly combusted, and no oxygen remains. An oxygen concentration of the exhaust gas is monitored by an oxygen concentration sensor 34 at all times. The ECU operates the electromagnetic clutch 42 and drives the air pump 37 on the basis of the oxygen concentration detection value. By supplying the secondary air to the exhaust gas using the air pump 37, it is possible to maintain activity of the catalyst 29 at all times and effectively purify the exhaust gas.

An air inlet 43 for receiving the secondary air is connected to the air pump 37, and the secondary air is supplied from the air inlet 43 to the air pump (in FIG. 7, the arrow A denotes a flow of the secondary air). The air inlet 43 is arranged in a lateral side of the crankcase 13 closely to the front side of the air pump 37 and has a generally cavity structure. In addition, an inlet duct 43a for receiving the air is opened in a front end of the air inlet 43 as illustrated in FIG. 9. The air inlet 43 has a gas-liquid separation capability and a sound muffling capability for the received air. Further, the air inlet 43 may be embedded with an air filter, and as a result, the secondary air blowing to the air pump 37 is purified.

The air pump 37 and the exhaust system are connected to each other by interposing the secondary air supply passage 44. According to this embodiment, the connecting portion 45 (45A and 45B) of the secondary air supply passage 44 (44A and 44B) is formed integrally with the cylinder block 14 included in the engine body, and the secondary air supply passage 44 extending from the right side face of the air pump 37 branches into two separate ways, and the branching secondary air supply passages 44A and 44B are connected to the connecting portions 45A (#1 and #2 cylinders) and 45B (#3 and #4 cylinders), respectively. Each connecting portion 45A and 45B is installed with a reed valve 46 for each cylinder, and a cover 47 is installed to cover the reed valve 46. A communicating passage 48 that causes the connecting portions 45A and 45B and the exhaust ports 19 of each cylinder to communicate with each other is provided, so that the secondary air discharge side of each reed valve 46 and the exhaust port 19 are connected to each other by interposing the communicating passage 48.

According to the third embodiment, the secondary air from the air pump 37 is supplied to the connection portions 45A and 45B through the secondary air supply passages 44A and 44B. In each connecting portions 45A and 45B, the secondary air output from the reed valve 46 is discharged to the exhaust port through the communicating passage 48 so that the secondary air is supplied to the exhaust gas.

Similarly, in this example, the intake system 21 is arranged in one side (right side) of the engine body in the left-right direction, and the exhaust passage 28 and the air pump 37 are arranged in the other side (left side) of the engine body in the left-right direction. In addition, as illustrated in FIGS. 7 and 9, a starter motor 33 is arranged in the side portion of the crankcase 13 in the other side of the left-right direction of the engine body, and the air pump 37 of the secondary air supply system is arranged in the side portion of the cylinder block 14 between the starter motor 33 and the exhaust passage 28. The output shaft of the starter motor 33 meshes with the flywheel 39 on its gears to rotate and drive the flywheel 39 in the event of an engine start.

According to the third embodiment of the invention, since the air pump 37 can be arranged in the vicinity of the exhaust passage 28, it is possible to shorten the length of the secondary air supply passage 44 as a secondary air channel for sending the secondary air to the exhaust passage 28. As a result, since routing of the secondary air supply passage 44 can be simplified, it is possible, to reduce a passage resistance for the air flow flowing inside and improve efficiency of the air pump. Therefore, it is possible to miniaturize the air pump.

Since the air pump 37 can be driven using the crankshaft 12 of the engine 10, it is possible to eliminate necessity of a driving source dedicated to the air pump 37. Therefore, it is possible to simplify and compactify a configuration of the engine 10 and thus the outboard motor 100.

Fourth Embodiment

Figure 10:
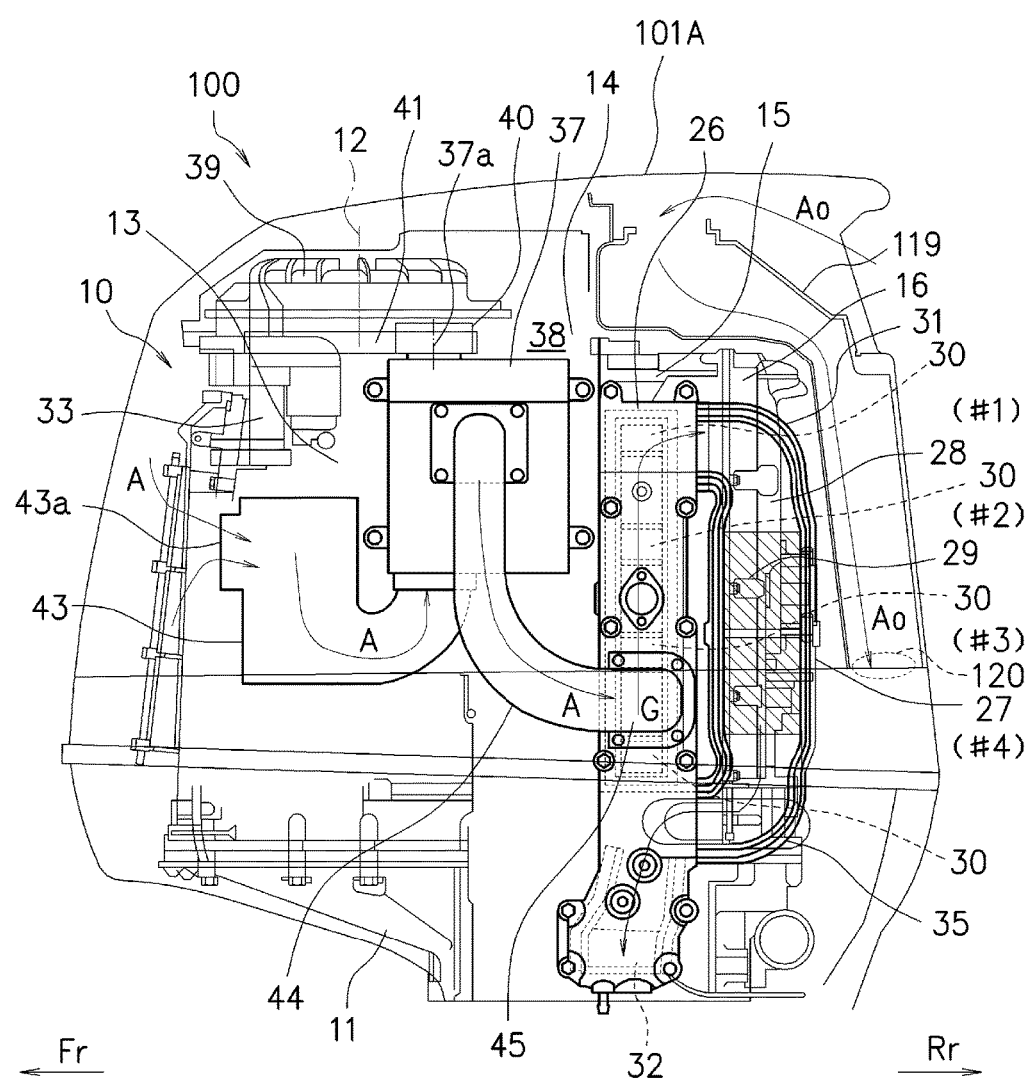
FIG. 10 is a left side view illustrating an engine of an outboard motor according to a fourth embodiment of the invention.
Figure 11:
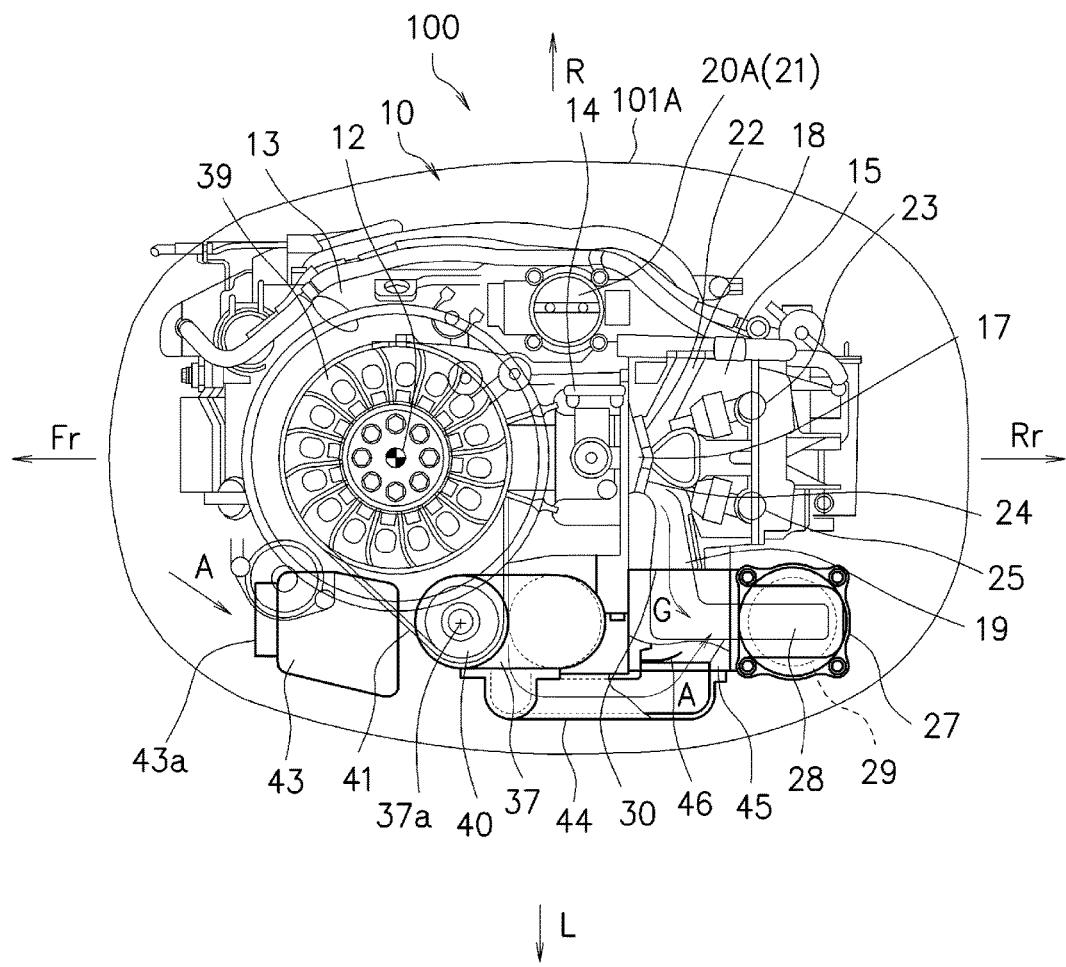
FIG. 11 is a top view illustrating the engine of the outboard motor according to the fourth embodiment of the invention.

Next, an engine for an outboard motor according to a fourth embodiment of the invention will be described. FIGS. 10 and 11 illustrate the fourth embodiment of the present invention. Specifically, FIG. 10 is a left side view illustrating an engine 10 according to the fourth embodiment, and FIG. 11 is a top view illustrating the engine 10. In FIGS. 10 and 11, like reference numerals denote like elements as in the first to third embodiments.

As an exemplary structure of the engine 10 according to this embodiment, a catalyst is installed in the middle of the exhaust passage of the exhaust system. As illustrated in FIG. 7, an exhaust passage is formed to extend from the exhaust manifold 26 via the catalyst housing portion 27 to the middle and lower units 102 and 103 provided in the lower part of the engine 10. The catalyst housing portion 27 is provided to extend vertically in parallel with the exhaust manifold 26 behind the exhaust manifold 26 and internally houses the catalyst 29. The exhaust manifold 26 included in a part of the exhaust passage is provided with a plurality of openings 30 (in this example, four openings) connected to the exhaust ports 19 of each cylinder. In addition, the upper parts of the exhaust manifold 26 and the catalyst housing portion 27 are connected to each other through the connecting passage 31. Furthermore, the exhaust passage 28 extends downward while it is curved under the catalyst housing portion 27 (the extension 35) and is connected to the exhaust communicating passage 32 formed inside the engine holder 11, so that the exhaust passage 28 communicates with the middle unit 102 through the exhaust communicating passage 32.

In this manner, the exhaust passage 28 includes the exhaust manifold 26, the connecting passage 31, the catalyst housing portion 27, and the exhaust communicating passage 32. Similar to the third embodiment, in the middle of the exhaust passage 28, an oxygen concentration sensor (not illustrated in FIGS. 10 and 11) for detecting an oxygen concentration of the exhaust gas is installed in an exhaust downstream side of the catalyst housing portion 27 that houses the catalyst 29, specifically, in a suitable region of the extension 35 from the lower part of the catalyst housing portion 27 (refer to FIG. 10). Using such an oxygen concentration sensor, it is possible to detect an oxygen concentration of the exhaust gas.

In the exhaust system, the exhaust gases discharged from the exhaust ports 19 of each cylinder flow into the opening 30 of the exhaust manifold 26 and are joined inside the exhaust manifold 26 (in FIGS. 10 and 11, the arrow G denotes a flow of the exhaust gas as necessary). The confluent exhaust gas flows upward inside the exhaust manifold 26 and flows into the catalyst housing portion 27 through the connecting passage 31 in the upper part thereof. Furthermore, the exhaust gas passes through the catalyst 29 inside the catalyst housing portion 27 and flows into the extension 35 from the lower part of the catalyst housing portion 27. Then, the exhaust gas passes through the exhaust communicating passage 32 inside the engine holder 11 and flows to the middle and lower units 102 and further the lower unit 103. Then, the exhaust gas is discharged to the water.

Furthermore, an air pump 37 configured to supply secondary air to the upstream side of the catalyst 29 is provided in the exhaust passage 28. This air pump supplies the secondary air to the exhaust gas flowing through the exhaust passage 28 in order to purify the exhaust gas, that is, supplies oxygen necessary to oxidize and detoxify hydrocarbons and carbon monoxides in the exhaust system. That is, oxidization of the exhaust gas is promoted by reacting oxygen with the exhaust gas, so that a discharge amount of hydrocarbons and carbon monoxides is reduced.

The power of the engine 10 may be used as a driving source of the air pump 37, and a power transmission device connected to the crankshaft 12 to drive the air pump 37 is provided. As a power transmission device, a flywheel 39 coupled to the crankshaft 12 and a pulley 40 installed in a rotation shaft 37a of the air pump 37 are connected by looping a belt 41. In this manner, the air pump 37 is rotatably driven by using the driving force of the crankshaft 12. However, in this case, power transmission therebetween may be controlled. For example, a clutch mechanism, specifically, an electromagnetic clutch 42 (refer to FIG. 2) is assembled to a mount portion of the pulley 40 of the rotation shaft 37a of the air pump 37. Using the electromagnetic clutch 42, connection/disconnection of power transmission of the driving force from the crankshaft 12 to the air pump 37 is controlled.

An air inlet 43 for receiving the secondary air is connected to the air pump 37, and the secondary air is supplied from the air inlet 43 to the air pump (in FIG. 10, the arrow A denotes a flow of the secondary air). The air inlet 43 is arranged in a lateral side of the crankcase 13 closely to the front side of the air pump 37 and has a generally cavity structure. In addition, an inlet duct 43a for receiving the air is opened in a front end of the air inlet 43, as illustrated in FIG. 11. The air inlet 43 has a gas-liquid separation capability and a sound muffling capability for the received air. Further, the air inlet 43 may be embedded with an air filter, and as a result, the secondary air blowing to the air pump 37 is purified.

According to the fourth embodiment, the air pump and the exhaust manifold 26 as a part of the exhaust passage 28 are connected to each other by interposing a secondary air supply passage 44. In this case, the single secondary air supply passage 44 extends downward from the left side face of the air pump 37, is curved to the rear side, and then extends to the left side face of the exhaust manifold 26. A leading end portion of the secondary air supply passage 44 is opened for connection to the exhaust manifold 26. The connecting portion 45 of the exhaust passage 28 for connection to the secondary air supply passage 44 is provided in an upstream side of the exhaust flow direction relative to the catalyst housing portion 27, and particularly, in this example, in the most upstream side of the exhaust flow direction in the exhaust manifold 26 (a region approximately matching the #4 cylinder). A reed valve 46 (check valve) is installed in the connecting portion 45 as illustrated in FIG. 11. The reed valve 46 prevents a reverse flow of the exhaust gas from the exhaust passage 28 to the air pump 37.

Similarly, in this example, the intake system 21 is arranged in one side (right side) of the engine body in the left-right direction, and the exhaust passage 28 and the air pump 37 are arranged in the other side (left side) of the engine body in the left-right direction. In addition, as illustrated in FIGS. 10 and 11, a starter motor 33 is arranged in the side portion of the crankcase 13 in the other side of the left-right direction of the engine body, and the air pump 37 of the secondary air supply system is arranged in the side portion of the cylinder block 14 between the starter motor 33 and the exhaust passage 28. The output shaft of the starter motor 33 meshes with the flywheel 39 on its gears to rotate and drive the flywheel 39 in the event of an engine start.

According to the fourth embodiment of the present invention, since the air pump 37 can be arranged in the vicinity of the exhaust passage 28, it is possible to shorten the length of the secondary air supply passage 44 as a secondary air channel for sending the secondary air to the exhaust passage 28. As a result, since routing of the secondary air supply passage 44 can be simplified, it is possible to reduce a passage resistance for the air flow flowing inside and improve efficiency of the air pump 37. Therefore, it is possible to miniaturize the air pump.

Since the air pump 37 can be driven using the crankshaft 12 of the engine 10, it is possible to eliminate necessity of a driving source dedicated to the air pump 37. Therefore, it is possible to simplify and compactify a configuration of the engine 10 and thus the outboard motor 100.

While preferred embodiments of the invention have been described and illustrated hereinbefore, it should be understood that they are only for exemplary purposes and are not to be construed as limitations. Any addition, omission, substitution, or modification may be possible without departing from the spirit or scope of the present invention.

Although the engine 10 is an in-line four-cylinder engine in the embodiments described above, the number of cylinders in the engine 10 may change.

According to the present invention, since the air pump can be arranged in the vicinity of the exhaust passage, it is possible to shorten the length of the secondary air supply passage as a secondary air channel for sending the secondary air to the exhaust passage. As a result, since routing of the secondary air supply passage can be simplified, it is possible to reduce a passage resistance for the air flow flowing inside and improve efficiency of the air pump. Therefore, it is possible to miniaturize the air pump.

Since the air pump can be driven using the crankshaft of the engine, it is possible to eliminate necessity of a driving source dedicated to the air pump. Therefore, it is possible to simplify and compactify a configuration of the engine.

What is claimed is:

1. An engine for an outboard motor comprising:
an in-line multiple-cylinder engine body provided with a crankshaft having an axial line directed to a vertical direction, a cylinder block comprising a plurality of vertically overlapping cylinders, the cylinders having axial lines directed backward in a horizontal direction, and a cylinder head disposed on the cylinder block;
an intake system configured to supply combustion air to the engine body;
an exhaust passage formed to connect the engine body and middle and lower units thereunder;
an air pump of a secondary air supply system configured to supply secondary air to the exhaust passage; and
an air inlet configured to supply the secondary air to the air pump,
wherein an intake system is arranged in one side of the engine body in a left-right direction,
wherein the exhaust passage and the air pump are arranged in a side of the cylinder block and the cylinder head of the engine body opposite to the intake system in the left-right direction, and
wherein the air inlet is arranged in a side of a crankcase of the engine body opposite to the intake system in the left-right direction.

2. The engine for the outboard motor according to claim 1, further comprising a starter motor arranged in the side of the crankcase of the engine body opposite to the intake system in the left-right direction,
wherein the air pump of the secondary air supply system is arranged in a side of the cylinder block between the starter motor and the exhaust passage.

3. The engine for the outboard motor according to claim 1, wherein the air pump is connected to a crankshaft of the engine through a power transmission device and is driven by power of the engine.

4. The engine for the outboard motor according to claim 3, wherein the power transmission device has a clutch mechanism capable of controlling transmission of a driving force.

* * * * *